Patented Jan. 9, 1951

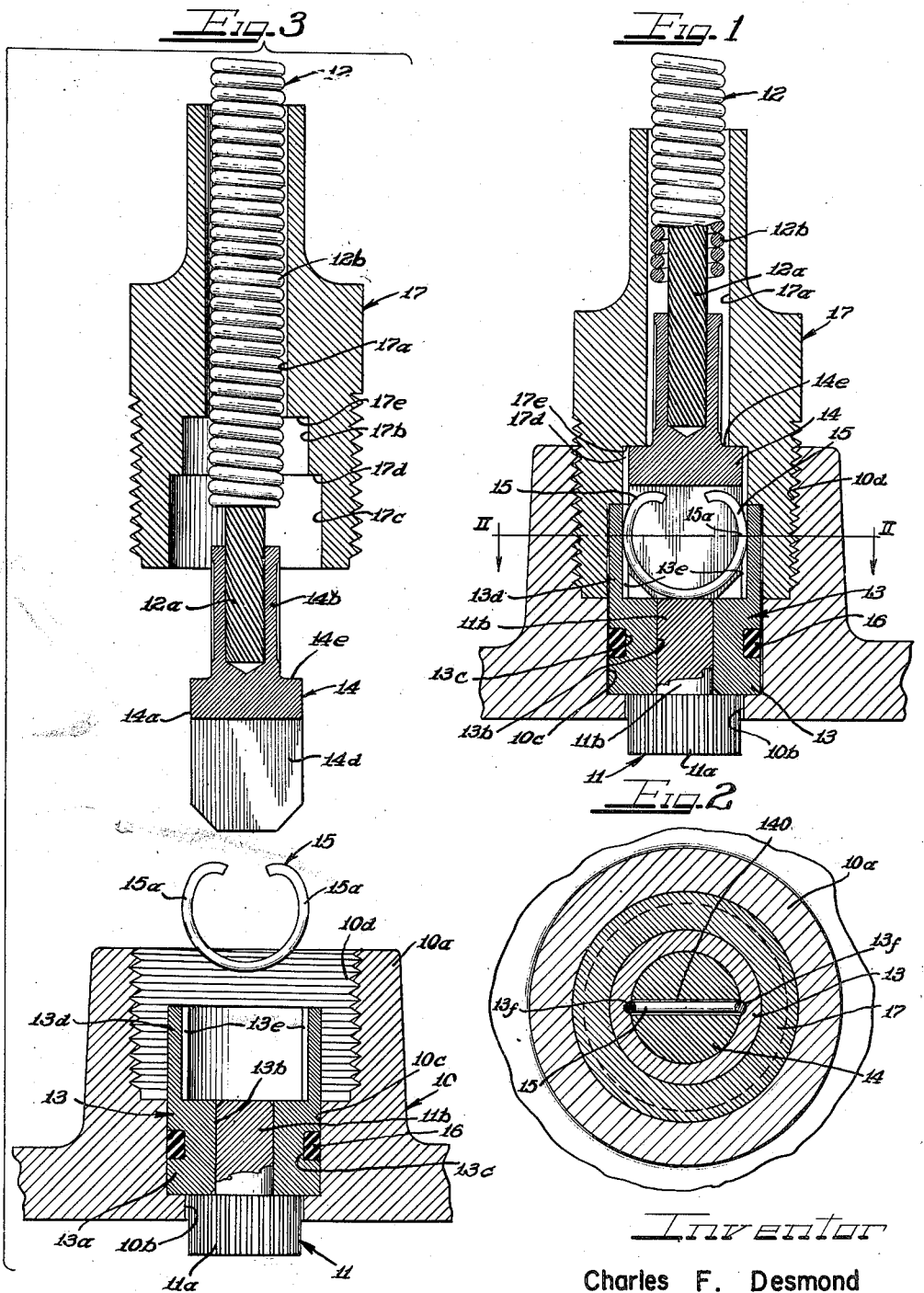
Charles F. Desmond

2,537,122

UNITED STATES PATENT OFFICE 2,537,122

SAFETY COUPLING FOR SHAFTS

Charles F. Desmond, Corfu, N. Y., assignor to Houdaille-Hershey Corporation, Detroit, Mich., a corporation of Michigan Application July 23, 1948, Serial No. 40,343

9 Claims. (Cl. 64—29)

This invention relates to a coupling for rotatable shaft-like members, and particularly to a coupling which will automatically prevent the transmission of an excessive torque between the coupled shaft-like members.

While not limited thereto, this invention finds particular application in effecting the coupling of a flexible shaft to a rotatable element. There are many applications in industry wherein a shaft, gear, dial, wheel or other rotatable member is disposed within a casing or housing and it is desired to rotatably drive such rotatable member from a distance through the medium of a flexible shaft. As is well known, any flexible shaft has relatively low torque transmitting properties as compared with a rigid shaft. As a result, it is possible for an unskilled operator to readily apply an excessive torque to the flexible shaft in an attempt to achieve the driving of the mechanism under adverse conditions, which torque will cause the breakage if not irreparable damage to the flexible shaft.

Accordingly, it is an object of the present invention to provide an improved safety coupling for rotatable shaft-like members which will co-rotatably secure such members under normal conditions but which will automatically interrupt the driving connection between such members upon the occurrence of a predetermined maximum torque therebetween.

It is an important object of this invention to provide a safety coupling construction for shaft-like members characterized by unusual simplicity of the components thereof and the ease of manufacture and assemblage of such coupling.

A particular object of the invention is to provide a safety coupling formed in its entirety by the assemblage of three elements, respectively a female element, a male element receivable in nested relationship with the female element, and a spring of the split ring type which is carried by the male element and is resiliently engageable in cooperating grooves in the female element to maintain a driving connection between the male and female elements except when an excessive torque occurs therebetween.

Still another object of the invention is to provide an improved coupling construction particularly adaptable for effecting the securement of a flexible shaft to a rotatable element disposed within a housing.

The specific nature of the invention, as well as other objects and advantages thereof, will become apparent to those skilled in the art from the following detailed description of the annexed sheet of drawings which, by way of preferred example only, illustrate one specific embodiment of the invention.

On the drawings:

Figure 1 is a sectional view taken through an asembled coupling arrangement embodying this invention.

Figure 2 is a sectional view taken on the plane II—II of Figure 1.

Figure 3 is an exploded sectional view of the elements assembled in Figure 1.

As shown on the drawings:

As previously indicated, this invention finds particular utility in effecting the coupling of a flexible shaft to a rotatable element disposed within the interior of a housing. The numeral 10 in the drawings refers to a portion of such a housing, while the numeral 11 indicates a rotatable element disposed within the housing which is to be driven by or to drive a flexible shaft indicated by the numeral 12. The housing 10 is provided with an integral bearing hub portion 10a which defines a bore 10b therethrough which is counterbored at 10c and again at 10d. The counterbore 10d is provided with internal threads. The driven element 11 disposed within the housing 10 is here illustrated as a gear 11a which is suitably rigidly secured to a stub-shaft portion 11b.

The elements of a coupling embodying this invention comprise respectively a female coupling element 13, a male coupling element 14, and a connecting spring element 15.

The female coupling element 13 is of generally cup-shaped configuration having a base portion 13a of substantial thickness which is centrally apertured as indicated at 13b and co-rotatably secured to the stub shaft 11b as by having a press-fit engagement therewith. The female coupling element 13 is journaled in the first counterbore 10c of the bearing hub 10a and rests upon the shoulder defined between the juncture of the bore 10b and the counterbore 10c. If a fluid seal is required between the inside and outside of housing 10, an annular groove 13c may be formed in the periphery of the base portion 13a of the female coupling element and a sealing ring 16 of suitable material mounted therein to effect a sealing engagement with the walls of counterbore 10c.

The annular wall portion 13d of the female coupling element 13 projects into the largest counterbore 10d of the bearing hub 10a. A pair of diametrally opposed, axially extending grooves or recesses 13e are formed in the inner surface of the peripheral wall 13d for a purpose that will be described.

The male coupling element 14 is of cylindrical, bolt-like configuration having an enlarged head portion 14a which is freely yet snugly insertable within the cylindrical recess defined by the peripheral wall 13d of the female coupling element 13. In addition, the male coupling element 14 has a centrally recessed, reduced diameter stem portion 14b in which is suitably rigidly secured the shaft core 12a of the flexible shaft 12. The flexible shaft 12 also embodies a surrounding helical wire casing 12b in conventional fashion.

The head portion 14a of the male coupling element 14 is provided with a diametrally disposed, axially extending slot 14d which is of substantially the same depth as the annular wall portion 13d of the female coupling element 13. A spring element 15 is then mounted in the slot 14d and is so constructed that portions thereof, indicated at 15a, tend to project radially beyond the periphery of the head portion 14a of the male coupling element 14 to engage in the axially extending grooves 13e formed in the female coupling element. In this manner, a driving connection is established between the male and female coupling elements. However, the spring 15 is further constructed and proportioned so that upon the occurrence of a predetermined torque between the male and female coupling elements, such spring will be cammed inwardly or compressed by the action of the side walls 13f of the grooves 13e so as to disengage from such grooves and thus interrupt the driving connection between the male and female coupling elements. Such action of the spring 15 is most conveniently obtained by forming such spring from resilient wire, shaped as a split ring element. To facilitate the camming action of the grooves 13e upon the spring 15, the side walls 13f of such grooves are preferably formed with a non-radial, generally inclined configuration.

To retain the male coupling element 14 in its inserted relationship with respect to the female coupling element 13, a retainer sleeve 17 is provided which is exteriorly threaded to permit it to be secured in the threaded counterbore 10d of the bearing hub 10a. The sleeve 17 is provided with a central bore 17a of sufficient diameter to freely accommodate the flexible shaft 12 and the stem portion 14b of the male coupling element 14. The bore 17a is counterbored at 17b so as to freely surround the head portion 14a of the male coupling element 14, and further counterbored as at 17c so as to freely surround the peripheral walls 13d of the female coupling element 13. The shoulder 17d formed at the juncture of counterbore 17c and counterbore 17b co-operate with the end face of the female coupling element to retain such against axial movement, while the shoulder 17e formed at the juncture of counterbore 17b and bore 17a cooperates with the shoulder 14e, defined between the head portion 14a and stem portion 14b of the male coupling element 14, to restrain the male coupling element 14 against axial movement and thus retain it in nested assemblage with the female coupling element 13.

The operation of the described coupling is believed to be obvious from the foregoing description. For transmission of torques up to a predetermined maximum, the male and female coupling elements are co-rotatably secured together by the split ring spring 15. When the transmitted torque exceeds a predetermined value, then the inwardly directed component of force exerted upon the ring spring 15 by the inclined wall surfaces 13f of the grooves 13e overcomes the resilient bias of the ring spring 15 and compresses such ring spring inwardly so that the portions 15a are no longer engaged in the grooves 13e in the female coupling element. Hence the driving connection between the male and female coupling elements is immediately interrupted, thereby precluding all possibility of damage to either the flexible shaft 12, or to gear 11, or any associated mechanism. When the transmitted torque falls below the predetermined value, the ring spring 15 will immediately snap outwardly into engagement with the grooves 13e and re-establish the driving connection between the male and female coupling elements.

It should be particularly noted that the described construction embodies only three principal parts each of which is of unusually simple configuration, permitting the economical manufacture thereof in large quantities by automatic machinery. Furthermore, the assemblage of the coupling elements is unusually convenient and requires no special tools or skill.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A connector for a pair of rotatable shaft-like members disposed with the ends thereof in axial alignment, comprising a hollow female element adapted to be co-rotatably secured to one of said members, a male element adapted to be rotatably secured to said other member, said male element having at least a portion thereof inserted in said female element in nesting relation, said female element having an axailly extending groove in its bore surface, and a ring spring mounted in said inserted portion of said male member and radially engaging said groove, whereby said male and female elements are secured for co-rotation, said spring being resiliently deformable out of said groove upon occurrence of a predetermined torque between said male and female elements.

2. A connector for a pair of rotatable shaft-like members disposed with the ends thereof in axial alignment, comprising a female element adapted to be co-rotatably secured to one of said members, a male element adapted to be rotatably secured to said other member, said male element having at least a portion thereof inserted in said female element in nesting relation, said female element having a recess adjacent said inserted portion of the male element, said male element having an axially extending slot therein, and a ring spring mounted in said slot and projecting radially therefrom to positively engage in said recess of the female element in the nested position of said male and female elements, said spring being resiliently deformable out of said recess upon the occurrence of a predetermined torque between said male and female elements.

3. A connector for a pair of rotatable shaft-like members disposed with the ends thereof in axial alignment, comprising a hollow female element adapted to be co-rotatably secured to one of said members, a male element adapted to be co-rotatably secured to said other member, said male element having at least a portion thereof disposed in said female element in nesting relation, said female element having a pair of diametrically opposed, axially extending grooves in its bore surface, said male element having a diametral, axially extending slot therein, and a wire ring spring mounted in said slot and having opposed sides projecting radially out of said slot to respectively engage in said grooves of said female element, said wire spring being resiliently compressible to be forced out of said grooves of the female element upon occurrence of a predetermined torque between said male and female elements.

4. A connector for a pair of rotatable shaft-like members disposed with the ends thereof in axial alignment, comprising a hollow female element adapted to be co-rotatably secured to one of said members, a male element adapted to be co-rotatably secured to said other member, said male element having at least a portion thereof disposed in said female element in nesting relation, said female element having a pair of diametrically opposed, axially extending grooves in its bore surface, said male element having a diametral, axially extending slot therein, and a wire ring spring projecting radially out of said slot to respectively engage in said grooves of said female element, said grooves having generally inclined side walls, said inclined side walls of said grooves being constructed and arranged to resiliently compress said spring to displace the same from said grooves upon the occurrence of a predetermined torque between said male and female coupling elements.

5. A rotational coupling comprising a bearing housing defining a bore and a counterbore, a female coupling element journaled in said bore, means on said female coupling element for co-rotatably engaging a first rotatable member, a male coupling element axially insertable in said female coupling element, said female coupling element having an axially extending groove in its bore surface, a spring mounted in said inserted portion of said male coupling element and engaging said groove, whereby said male and female elements are co-rotatably secured, said spring being resiliently deformable out of said groove upon the occurrence of a predetermined torque between said male and female coupling elements, a retaining sleeve surrounding said male coupling element and secured in said counterbore, and means on said retaining sleeve engageable with said male coupling element to prevent axial removal of said male coupling element from nested engagement with said female coupling element.

6. A rotational coupling comprising a bearing housing defining a bore and a counterbore, a hollow female coupling element journaled in said bore, means on said female coupling element for co-rotatably engaging a first rotatable member, a male coupling element axially insertable in said female coupling element, said female coupling element having a pair of diametrically opposed, axially extending grooves in its bore surface, said male coupling element having a diametral, axially extending slot in its inserted portion, a split wire ring spring mounted in said slot and having opposed sides thereof projecting radially out of said slot to respectively engage in said grooves in the female coupling element, said grooves having generally inclined side walls so as to exert a camming action on said spring to displace said spring out of said grooves upon the occurrence of a predetermined torque between said male and female coupling elements, a retaining sleeve surrounding said male coupling element and secured in said counterbore, and means on said retaining sleeve engageable with said male coupling element to prevent axial removal of said male coupling element from nested engagement with said female coupling element.

7. A rotational coupling comprising a cup-shaped element secured to a first rotatable member, said cup-shaped element having an axially extending recess in the inner peripheral wall surface thereof, a plug element secured to a second rotatable member, said plug element having a portion thereof freely insertable within said cup-shaped element, said insertable portion of the plug element having an axially extending slot therein opening in at least one side of the peripheral surface of said cylindrical portion, a split ring spring mounted in said slot and having a portion thereof normally projecting out of said slot and engageable in said recess, whereby said plug element and said cup-shaped element are co-rotatably connected, said ring spring being resiliently compressible to lie entirely within said slot of the plug element, and the walls of said grooves being inclined to exert a compressing action on said split ring spring, whereby when excessive torque is applied to one of said rotatable members said inclined walls compress said ring spring within said slot to interrupt the driving connection between said plug and said cup shaped element.

8. A rotational coupling comprising a cup-shaped element adapted to be secured to a first rotatable member, said cup-shaped element having a pair of diametrically opposed, axially extending recesses in the inner peripheral wall thereof, a plug element adapted to be secured to a second rotatable member, said plug element having a cylindrical portion snugly insertable in said cup-shaped element, said cylindrical portion of the plug element having a diametral, axially extending slot therein opening through both sides of the peripheral surface of said cylindrical portion, a split ring spring mounted in said slot, the unstressed configuration of said spring being constructed and arranged so that portions thereof normally project radially out of both sides of said slot to respectively engage in said recesses in said cup-shaped element whereby said plug element and said cup-shaped element are co-rotatably connected, said split ring spring being resiliently compressible to lie entirely within the confines of said plug element, and the walls of said recesses being inclined to exert a camming action on the engaging portions of said split ring spring to displace said spring out of said recesses upon the occurrence of a predetermined torque between said cup-shaped element and said plug element, whereby the driving connection between said elements is interrupted.

9. A rotational coupling comprising freely interfitting male and female members relatively rotatable except when coupled, said female member having a longitudinally extending recess and said male member having a cooperating longitudinal slot, and a contractible split ring of resilient material partially confined in said slot and having a closed loop portion normally extending into said recess to co-rotatably couple said members but contractible out of said recess upon the occurrence of a predetermined torque between said members to release said members for relative rotation.

CHARLES F. DESMOND.

REFERENCES CITED

The following references are of record in the file of this patent:

UNITED STATES PATENTS

| Number | Name | Date |
| --- | --- | --- |
| 1,320,582 | Sperling | Nov. 4, 1919 |
| 1,468,322 | Odom | Sept. 13, 1923 |
| 1,831,317 | Norris | Nov. 10, 1931 |
| 2,259,797 | Cohen | Oct. 21, 1941 |
| 2,441,038 | Siesel | May 4, 1948 |